United States Patent
Grever et al.

(10) Patent No.: US 12,433,184 B2
(45) Date of Patent: Oct. 7, 2025

(54) METHOD FOR PERFORMING DRIVING ROUTE OPTIMIZATION

(71) Applicants: Krone Agriculture SE, Spelle (DE); Lemken GmbH & Co. KG, Alpen (DE)

(72) Inventors: Alexander Grever, Osnabrück (DE); Hannes Mählmann-Dunker, Neuenkirchen (DE); Stefan Haverkamp, Ostbevern (DE)

(73) Assignees: KRONE AGRICULTURAL SE, Spelle (DE); LEMKEN GMBH & CO. KG, Alpen (DE)

( * ) Notice: Subject to any disclaimer, the term of this patent is extended or adjusted under 35 U.S.C. 154(b) by 277 days.

(21) Appl. No.: 18/183,598

(22) Filed: Mar. 14, 2023

(65) Prior Publication Data
US 2023/0284549 A1 Sep. 14, 2023

(30) Foreign Application Priority Data
Mar. 14, 2022 (DE) .......................... 102022105922.7

(51) Int. Cl.
*A01B 69/04* (2006.01)
*G05D 1/00* (2024.01)

(52) U.S. Cl.
CPC ......... *A01B 69/008* (2013.01); *G05D 1/0219* (2013.01)

(58) Field of Classification Search
CPC .............................. A01B 69/008; A01B 69/04
(Continued)

(56) References Cited

U.S. PATENT DOCUMENTS 9,933,787 B2 * 4/2018 Story .................. G05D 1/0278
10,606,962 B2 * 3/2020 Koch ...................... G06F 30/13
(Continued)

FOREIGN PATENT DOCUMENTS

BR  122022022150 B1 * 6/2024
CN  118168557 A * 6/2024 ............. G01S 17/89
(Continued)

OTHER PUBLICATIONS

Schönegg, et al., "Global Path Planning for Autonomous Vehicles in Orchards and Vineyards," 2024 13th International Workshop on Robot Motion and Control (RoMoCo), Poznań, Poland, 2024, pp. 1-8, doi: 10.1109/RoMoCo60539.2024.10604355. (https://ieeexplore.ieee.org/document/10604355) (Year: 2024).*

(Continued)

*Primary Examiner* — Atul Trivedi
(74) *Attorney, Agent, or Firm* — Practus, LLP; Kevin M. Kercher

(57) ABSTRACT

A method is provided for performing driving route optimization in field cultivation having a plurality of cultivation steps. In each cultivation step a predefined cultivation area is driven through by an agricultural machine in accordance with a driving route ($F_1$-$F_5$) containing a plurality of parallel lanes ($S_1$-$S_5$). The driving route ($F_1$-$F_5$) is able to be characterized by an orientation ($A_1$, $A_2$) of the lanes ($S_1$-$S_5$), a positioning ($P_1$-$P_4$) that defines positions of all of the lanes ($S_1$-$S_5$), and an order ($R_1$-$R_5$) in which the lanes ($S_1$-$S_5$) are driven through.

16 Claims, 7 Drawing Sheets

(58) Field of Classification Search
USPC .......................................................... 701/24
See application file for complete search history.

(56) References Cited

U.S. PATENT DOCUMENTS

| | | | | |
|---|---|---|---|---|
| 12,207,582 | B1 * | 1/2025 | Castilla-Rubio | ....... G05D 1/229 |
| 2018/0359904 | A1 | 12/2018 | Foster et al. | |
| 2019/0208695 | A1 | 7/2019 | Plessen | |
| 2020/0356096 | A1 * | 11/2020 | Leeb | .................. G01C 21/3407 |
| 2021/0088354 | A1 * | 3/2021 | Anderson | ............. A01B 79/005 |
| 2021/0267115 | A1 * | 9/2021 | Fjelstad | ............... A01B 69/008 |
| 2021/0311481 | A1 * | 10/2021 | Hirthammer | ........ G05D 1/0088 |
| 2022/0011444 | A1 * | 1/2022 | Eichhorn | ............. G05D 1/0297 |
| 2023/0065442 | A1 * | 3/2023 | Spiekermann | ..... A01D 41/1271 |
| 2023/0222454 | A1 * | 7/2023 | Cella | ........................ G06N 7/01 |
| | | | | 705/28 |
| 2023/0284548 | A1 * | 9/2023 | Grever | ................. G05D 1/0219 |
| 2023/0284549 | A1 * | 9/2023 | Grever | ................. A01B 69/008 |
| 2025/0113776 | A1 * | 4/2025 | Knopf | .................... A01D 46/30 |
| 2025/0155893 | A1 * | 5/2025 | Di Cecilia | ........... G05D 1/2435 |
| 2025/0171008 | A1 * | 5/2025 | Peranandam | ......... B60W 10/06 |

FOREIGN PATENT DOCUMENTS

| | | | | |
|---|---|---|---|---|
| CN | 118243109 A * | 6/2024 | | ............. G01C 21/20 |
| CN | 119168150 A * | 12/2024 | | ............. G06Q 50/02 |
| DE | 102016121523 A1 | 5/2017 | | |
| EP | 1602267 A2 | 12/2005 | | |
| EP | 2417844 B1 * | 5/2017 | | ........... A01B 69/008 |
| EP | 3508045 A1 | 7/2019 | | |
| EP | 3591488 A1 | 1/2020 | | |
| EP | 3467606 B1 * | 7/2022 | | ........... A01B 69/008 |
| EP | 4434313 A1 * | 9/2024 | | ............. G05D 1/622 |
| EP | 4490998 A1 * | 1/2025 | | ............. G05D 1/646 |
| EP | 4492181 A1 * | 1/2025 | | ........... A01B 69/008 |
| EP | 4492184 A1 * | 1/2025 | | ........... A01B 69/008 |
| JP | 2021094030 A * | 6/2021 | | |
| JP | 6986535 B2 * | 12/2021 | | ......... A63B 69/3691 |
| JP | 2025022817 A * | 2/2025 | | ............ G05D 1/0238 |
| JP | 2025022818 A * | 2/2025 | | ............ G05D 1/0212 |
| KR | 102168104 B1 * | 10/2020 | | ............. B60W 40/02 |
| KR | 20200116437 A * | 10/2020 | | ............. B60W 30/14 |
| KR | 20220070683 A * | 5/2022 | | ............. B60W 30/14 |
| TR | 2021003997 A1 * | 9/2022 | | ............. A01B 49/06 |
| WO | WO-2020160863 A1 * | 8/2020 | | ........... A01B 79/005 |
| WO | 2021025108 A1 | 2/2021 | | |
| WO | WO-2022069846 A1 * | 4/2022 | | ........... A01B 79/005 |
| WO | WO-2023095856 A1 * | 6/2023 | | ............. G05D 1/622 |
| WO | WO-2023106158 A1 * | 6/2023 | | ........... A01B 69/008 |
| WO | WO-2023119871 A1 * | 6/2023 | | ........... A01B 69/008 |

OTHER PUBLICATIONS

Fass, et al., "Route Planning for a Tractor in an Agriculture Field with Obstacles," 2022 International Conference of Advanced Technology in Electronic and Electrical Engineering (ICATEEE), M'sila, Algeria, 2022, pp. 1-6, (https://ieeexplore.ieee.org/document/10093717) (Year: 2022).*

* cited by examiner

METHOD FOR PERFORMING DRIVING ROUTE OPTIMIZATION

CROSS REFERENCE

This application claims priority to German Patent Application No. 10 2022 105922.7, filed Mar. 14, 2022, the entirety of which is hereby incorporated by reference.

FIELD OF THE INVENTION

The present invention relates to a method for performing driving route optimization.

BACKGROUND OF THE INVENTION

When cultivating a useful agricultural area, for example a given plot, an agricultural machine gradually covers the entire surface area in a plurality of lanes. In order to change between the parallel lanes, there is a need for turning paths or turning maneuvers that, together with the sections in the lanes, form the entire driving route. For efficient cultivation, it is necessary to plan the driving route or select a driving strategy. A distinction may be drawn here between three different parameters or groups of parameters: the orientation of the (parallel) lanes, the positions of the lanes and the order in which the lanes should be covered.

Selecting and defining a driving strategy, in the case of purely human planning, is based on collective experience of the machine operator. In the case of automated or assistive planning, the following elementary steps are performed independently of one another and in some cases also just on their own. In a first step, an orientation is selected taking into consideration an optimization criterion (for example minimizing the number of turning maneuvers). This is achieved by solving a mathematical optimization problem. In a second step, the order in which lanes should be covered is ascertained, for example with the aim of minimizing the distance traveled or the time that the machine requires in a headland. This is achieved by solving a combinatorial optimization problem. Such automated planning and definition of a driving strategy is achieved either using a software component within a farm management information system or as a component close to the vehicle in the form of a feature of a conventional steering system. The entire field cultivation generally comprises multiple successive cultivation steps that are carried out for example by different agricultural machines. Due to the different properties of the agricultural machines, different optimum driving routes or driving strategies generally result for individual cultivation steps. However, the individual cultivation steps are generally linked in that it is necessary to perform work in the same orientation in all cultivation steps.

BRIEF SUMMARY OF THE INVENTION

The object of the invention is to enable optimized agricultural cultivation of a predefined cultivation area in multiple cultivation steps.

To this end, provision is made for a method for performing driving route optimization in field cultivation having a plurality of cultivation steps, wherein in each cultivation step a predefined cultivation area is driven through by an agricultural machine in accordance with a driving route containing a plurality of parallel lanes, wherein the driving route is able to be characterized by an orientation of the lanes, a positioning that defines positions of all of the lanes, and an order in which the lanes are driven through, wherein the orientation is the same for all cultivation steps, wherein: for a plurality of cultivation steps, in each case an automatic optimization of the order is performed for each of a plurality of combinations of in each case an orientation and a positioning by ascertaining, from a plurality of orders, an order that is optimum for this combination in accordance with a defined optimization criterion for performing driving route optimization, wherein in each case combinations with corresponding orientation are taken as a basis for all cultivation steps; an automatic optimization of the driving routes for each cultivation step is performed by ascertaining, from the plurality of combinations, incorporating the optimum order ascertained for the respective combination, a combination that is optimum in accordance with the optimization criterion and that corresponds to an optimum driving route for this cultivation step, wherein the orientation of the optimum driving routes is the same for all cultivation steps; and control data for controlling at least one agricultural machine during each of the cultivation steps are generated automatically, wherein the control data represent the optimum driving route.

The method is intended to optimize driving routes in field cultivation, wherein this field cultivation comprises a plurality of cultivation steps. The respective cultivation step is carried out by an agricultural machine, wherein different cultivation steps are generally performed by different agricultural machines. Several or all working steps may however also be performed by the same agricultural machine. The agricultural machine may also be referred to as an agricultural work machine. This expressly also includes tandem systems comprising a towing vehicle and at least one machine and/or one trailer towed thereby. The agricultural machine may in particular be a harvesting machine such as a field chopper, a combine harvester, a baler or a loading wagon. However, it could also for example be a tractor with a tedder, a plough, a fertilizer spreader, a manure tanker or the like.

As part of the respective cultivation step, the agricultural machine drives in accordance with a driving route that contains a plurality of parallel lanes in a cultivation area, for example farmland, a field or part thereof, wherein the terms "field" and "farmland" are used synonymously here for simplification. The actual cultivation, for example ploughing, spreading manure, mowing, tedding, harvesting or the like, generally takes place in this cultivation area. A lane, which could also be referred to as cultivation lane, in this connection corresponds to part of the driving route of the agricultural machine in the cultivation area, wherein provision is normally made for the entire or at least most of the surface area of the cultivation area to be gradually cultivated by covering individual lanes. The lanes run in parallel, that is to say the distance between two adjacent lanes is constant over their entire length. In addition to the lanes within the cultivation area, the driving route however also includes turning paths that are necessary for lane changes and/or a turning maneuver when the agricultural machine changes from one lane to another, normally at a headland that adjoins the cultivation area, and more precisely is formed at the edge thereof. Such a headland may for example be located outside the field or it may be an edge area of the field that is cultivated, for example harvested, in advance at the start before the cultivation of the cultivation area, or in some cases also afterwards, which may also depend on the type of cultivation.

On the whole, the driving route may be characterized by an orientation of the lanes, a positioning that defines positions of all of the lanes, and an order in which the lanes are driven through. In the case of straight lanes, the orientation corresponds to a horizontal angle or azimuthal angle; it could also be said to correspond to a cardinal direction in which all of the lanes run. It goes without saying that, instead of indicating an angle in degrees, other indications that allow an unambiguous assignment could also be used. The orientation however does not define the positions of the individual lanes. This is done by the positioning. One option is for the positioning for each lane to contain two-dimensional coordinates of a point through which the respective lane leads. Together with the orientation, the arrangement of the lane is thus completely defined. However, the distance or the lateral offset between mutually adjacent lanes is generally identical for all lanes and corresponds to a track width, which may correspond to the effective cultivation width of the agricultural machine, that is to say the width that is able to be effectively cultivated transverse to the direction of travel. In the case of a combine harvester or a field chopper, this would be for example the width of the harvesting head, in particular minus a safety margin of a few centimeters. In the case of a bale press or a loading wagon, the width of the track usually corresponds to the working width of the previous process, such as for example swathing or mowing with swathing discharge. The positions of all of the lanes are thus able to be defined by a single point of a lane with knowledge of the track widths, using the two-dimensional coordinates of which point the positioning is able to be expressed. The driving route is ultimately able to be characterized by the order in which the lanes, which are defined spatially in particular by orientation and positioning, are driven through. This makes it possible to display various driving strategies, for example in which the agricultural machine changes from one lane to the in each case spatially closest lane or else to the one after that, via the one after that, etc. By way of example, in the case of cultivation areas of irregular shape, it may also make sense to make a change to the next lane in one subarea, while a change is made to the lane after that in another subarea, or the like. With regard to the amount of data, the order of N lanes may be expressed by an N-tuple, for example an N-dimensional vector.

The orientation is in this case the same for all cultivation steps. Even though it is possible for the positioning and order to differ in the individual cultivation steps, the same orientation is provided for all cultivation steps. It may also be said that the orientation in the first cultivation step defines the orientation for all further cultivation steps.

The method comprises the steps mentioned below, these expressly not necessarily having to be carried out in the stated order. The chronological sequence of two steps may be reversed in relation to the order in which they are cited. It is likewise possible for two steps to be carried out partially or fully at the same time.

In one method step, for a plurality of cultivation steps, in each case an automatic optimization of the order is performed for each of a plurality of combinations of in each case an orientation and a positioning by ascertaining, from a plurality of orders, an order that is optimum for this combination in accordance with a defined optimization criterion for performing driving route optimization, wherein in each case combinations with corresponding orientation are taken as a basis for all cultivation steps. In other words, a plurality of possible combinations is considered for the respective cultivation step, wherein each combination consists of an orientation and a positioning or combines these with one another. For each of these combinations, which in particular in each case completely defines the spatial arrangement of the lanes, an optimization of the orders is performed by ascertaining, from a plurality of orders, an order that is optimum with regard to the optimization criterion.

Consideration is thus given to a plurality of orders that constitute candidates for an optimum order, and it is investigated, based on the optimization criterion for performing driving route optimization, which of these orders is optimum for the respective combination, in particular of orientation and positioning. To take account of the fact that, in the field cultivation to be carried out later on, the orientation is the same in all cultivation steps, in each case combinations with a matching orientation are taken as a basis for all cultivation steps. In other words, when the plurality of combinations for the first cultivation step contains a combination with a specific orientation, the plurality of combinations for each further cultivation step also contains at least one combination with this orientation. The optimization takes place automatically, that is to say using a machine or in a computer-aided manner. Where the term "automatic/automatically" is used here and below, this in particular includes the possibility of performing the corresponding processes fully or partially using software that is implemented on suitable hardware. This step and further steps of the method may for example be performed by a farm management information system (FMIS).

In principle, all conceivable orders could be investigated for the optimization, that is to say, in the case of N lanes, N! orders. Many of these theoretically conceivable orders may however be excluded from the outset, for example an order containing multiple lane changes to lanes that are in each case far away or the like, as a result of which computing effort is considerably reduced. This optimization of the order is performed for each of the plurality of combinations, wherein different optimum orders may generally result for different combinations. In general, different combinations of orientation and positioning may be taken as a basis for different cultivation steps. Even if this is not the case, different optimum orders generally result for different cultivation steps due solely to the fact that different agricultural machines operate with different track widths and one and the same positioning thus leads to different numbers of lanes. The turning radius of different agricultural machines may furthermore differ, for example, meaning that a specific type of lane change may be efficient for one agricultural machine, while it is inefficient or even impossible for another agricultural machine.

Furthermore, an automatic optimization of the driving routes for each cultivation step is performed by ascertaining, from the plurality of combinations, incorporating the optimum order ascertained for the respective combination, a combination that is optimum in accordance with the optimization criterion and that corresponds to an optimum driving route for this cultivation step, wherein the orientation of the optimal driving routes is the same for all cultivation steps. While the optimization of the orientation may be considered to be optimization on a bottom level, the optimization of the driving route may be considered to be an optimization on a top or higher level, wherein reference may also be made here and below to "optimization levels" instead of "levels". In the process, it is ascertained which of the plurality of combinations of orientation and positioning, together with the optimum order ascertained therefor, should be considered to be optimum in accordance with the optimization criterion. It goes without saying that the abovementioned step in which the optimum order is ascertained has to have been carried out for a specific combination before this combination is able to be compared with other combinations in this regard. However, it is not necessary for the total amount of all combinations to be considered to be defined first. By way of example, it would be conceivable for the total range of all combinations to first be covered with a comparatively coarse raster, with for example the orientation being varied in 10° increments and the positioning being varied in 50 cm increments. After this, a range that has turned out to be advantageous over other ranges could be investigated with a finer raster, with for example the orientation being varied in 1° increments and the positioning being varied in 10 cm increments.

The optimum combination thus ascertained corresponds, together with the associated optimum order, to an optimum driving route for this cultivation step. The optimum driving routes normally differ from one another in the various cultivation steps. By definition, these optimum driving routes are however ascertained such that they all have the same orientation. In this respect, the optimization of the driving routes with respect to one another is linked by the constraint that the orientation is the same for all cultivation steps. The term "optimum driving route" should be understood to mean that it is the best driving route that was found in accordance with the optimization criterion. In some cases, there could actually be a better driving route that was however not found, for example because not enough combinations of orientation and positioning were investigated.

In each automatic optimization, various methods for finding the optimum solution or for searching for the optimum solution may be used, in particular metaheuristic methods such as simulated annealing, genetic or evolutionary algorithms.

In a further method step, control data for controlling at least one agricultural machine during each of the cultivation steps are generated automatically, wherein the control data represent the optimum driving route. The control data in all cases contain the information needed to control the agricultural machine along the optimum driving route. In the corresponding cultivation step, the agricultural machine may be controlled in accordance with the control data. For each cultivation step, different agricultural machines may be used or one agricultural machine may perform multiple, in particular even all, cultivation steps. The term "control" refers here in general to any targeted influencing of the orientation and/or movement state of the agricultural machine, that is to say for example steering, acceleration, braking, etc. The agricultural machine may thus be controlled on the basis of the control data such that it ideally follows the ascertained optimum driving route. The format of the control data and the content thereof may be selected differently, in particular on the basis of the respective agricultural machine and also possibly further components used implement the method. The driving route may in particular be represented by a more or less dense sequence of waypoints. The control data may also contain explicit steering instructions, or just position indications for waypoints, with the appropriate steering parameters for moving from one waypoint to the next being ascertained on the part of the agricultural machine. It goes without saying that control data may be generated for a plurality of agricultural machines for a respective cultivation step and/or for one agricultural machine for a plurality of cultivation steps.

According to the invention, the optimization criterion takes into consideration each of the cultivation steps, such that the driving route for the respective cultivation step is optimized on the basis of all cultivation steps. As a result, it is taken into consideration that there is a relationship between the individual cultivation steps, in particular because the orientation of the lanes is the same for all cultivation steps. In addition, there may be further relationships, for example due to the fact that each agricultural machine compresses the ground when driving through the cultivation area, which significantly impairs the area affected thereby. In this respect, it is expedient for an agricultural machine to drive as often as possible where possible with its wheels through the same area as the previous agricultural machine, rather than compressing a previously uncompressed area. For these and other reasons, it is advantageous to holistically consider all cultivation steps. The procedure according to the invention may in principle deliver optimization results other than an isolated optimization of individual cultivation steps. It could for example be the case that a combination that is extremely advantageous in one processing step when considered on its own contains an orientation that necessarily leads to a highly disadvantageous combination in another cultivation step. Such disadvantages may be avoided since all cultivation steps are taken into consideration when optimizing the driving route of an individual cultivation step. The corresponding optimization criterion is in this case formulated such that all cultivation steps are accordingly incorporated. The individual driving route of an agricultural machine may in this case be sub-optimum when considered in isolation, but leads, together with the driving routes in other cultivation steps, to an optimum overall result.

In the context of the invention, it would be possible for example for each orientation to be fixedly assigned a predefined positioning, such that effectively only the order and the orientation are treated as variation parameters. One advantageous configuration by contrast proposes that the plurality of combinations contains different combinations of a single orientation with different positionings and, in order to optimize the driving route, an optimum positioning from a plurality of positionings is ascertained for each of a plurality of orientations, and the optimum combination from a plurality of combinations of in each case an orientation and the optimum positioning ascertained with respect thereto is ascertained. In other words, in this case there is no unambiguous assignment between the orientation and the positioning, but rather one and the same orientation is combined with different positionings, with the resultant different combinations being able to be compared with one another as part of the optimization. This constitutes a difference from methods in the prior art, in which, as part of an optimization, although different orientations are considered, the respective orientation is combined with a specific positioning in accordance with a defined criterion, for example in a manner such that an edge lane is positioned such that the agricultural machine, taking into consideration its individual working width, moves exactly along the edge of the cultivation area without it thus protruding beyond the cultivation area. Even though such a definition is suitable for the individual lane, it may nevertheless lead to a sub-optimum solution when considering all of the lanes. By way of example, this selection on the opposite edge of the cultivation area could lead to an extremely short and therefore uneconomical lane, which would for example not occur if it were also to be accepted that the first-mentioned edge lane were to be moved such that the agricultural machine projects laterally beyond the cultivation area.

In the configuration described here, various possible positionings may be compared in the case of one and the same orientation with regard to the optimization criterion and thus, out of these, the positioning that is optimum in combination with the orientation in question is ascertained. In other words, a plurality of orientations are considered overall. For each of these orientations, a positioning that is optimum with regard to the optimization criterion is ascertained, wherein in turn the optimal order already ascertained is taken as a basis. In other words, this optimization procedure in turn implicitly involves ascertaining the optimum order for each combination of the orientation with one of the positionings. Considered hierarchically, an optimum order for a combination of orientation and positioning is thus ascertained on the bottom level. An optimum positioning with respect to a specific orientation is then ascertained on a middle level, with the optimum order ascertained on the bottom level being taken as a basis. An optimum orientation is then ascertained on a top level, with the optimum positioning and optimum order ascertained on the middle and the bottom level being taken as a basis. When searching for an optimum positioning, it is not necessary to take into consideration the entire cultivation area. Provided that the positioning is characterized by two-dimensional coordinates of a single point, as described above, it is instead sufficient to take into consideration only points on a straight search line transverse to the orientation, wherein the length of the search line corresponds to the track width. Displacements in the direction of the orientation do not change the arrangement of the lanes; likewise, a displacement transverse to the orientation by an integer multiple of the track width again leads to an identical arrangement of the lanes. By way of example, in the case of an agricultural machine with a track width of 8 m and an orientation in the north-to-south direction, it is enough to investigate positions along an 8 m-long search line in the east-to-west direction.

The optimization criterion is preferably based at least partially on an optimization of an optimization value that is ascertained by summing contributions of the driving routes of the cultivation steps. The optimization value may in many cases also be referred to as effort value or cost value, wherein the optimization of the optimization value then lies in a minimization. However, it would also be conceivable, depending on the type or definition of the optimization value, for the optimization to lie in a maximization thereof. In the simplest case, the optimization criterion consists of a minimization or maximization of the optimization value. In other words, those driving routes that optimize the optimization value overall are optimum. As will be explained in more detail below, other variables, for example further optimization values, could however also be taken into consideration, such that the optimization of one optimization value competes with other objectives. In any case, the optimization value is ascertained by summing contributions of the driving routes of the individual route sections. Each driving route, that is to say the respective driving route of each of the cultivation steps, is assigned a contribution that is added when ascertaining the optimization value. If for example the optimization value corresponds to a total travel distance that has to be driven through in all cultivation steps, the contribution of a driving route corresponds to the length thereof. The optimization value W may be computed as follows:

$$W=\Sigma_i W_i$$

wherein $W_i$ represents the contribution of the i-th driving route, that is to say the driving route of the i-th cultivation step and the sum of i runs over all cultivation steps.

The contribution of a driving route to the optimization value is preferably ascertained by summing contributions of individual route sections of a driving route. In other words, the individual driving routes or cultivation steps are summed, on the one hand, and contributions of individual route sections of the respective driving route are summed, on the other hand. Each route section is assigned a contribution, and if the driving route contains the route section, the contribution is added when ascertaining the optimization value. If for example the optimization value corresponds to a driving distance that has to be driven through in the driving route, the contribution of a route section corresponds to the length thereof. Overall, the optimization value may be calculated as follows:

$$W=\Sigma_i W_i = \Sigma_{i,j} W_{ij}$$

wherein $W_{ij}$ represents the contribution of the j-th route section of the i-th driving route and the sum of j runs over all route sections of the i-th driving route.

It is preferable for the optimization criterion in each optimization to take into consideration both route sections of the lanes and route sections of turning paths connecting the lanes, wherein the route sections of the turning paths are taken into consideration on the basis of the respective order. In other words, if for example a specific optimization value of the driving route is to be minimized or to be maximized, not only the contribution of the lanes to this optimization value is taken into consideration, but also the contribution of the turning paths that need to be driven through within the driving route when changing from one lane to the next lane, specifically on the basis of the underlying order. The latter influences for example the underlying driving distance for individual turning paths, in particular depending on whether a change is made to an adjacent lane, to a next lane, to a lane after that, etc., the required time, fuel consumption and/or other parameters. In other words, the contribution that is taken into consideration is normally not constant for all possible orders, but rather depends on the respective order, that is to say it is a function of the order. This of course does not rule out the contribution for some orders being able to be the same. This embodiment is generally combined with the abovementioned embodiment such that the contribution of a driving route to the optimization value is ascertained by summing contributions of route sections of the lanes and route sections of the turning paths of a driving route, wherein the contributions of the route sections of the turning paths are dependent on the order.

The optimization criterion in each optimization advantageously takes into consideration a route section of a turning path connecting two lanes at least on the basis of a relative position of these lanes. In other words, with regard to the influence of a turning path, it is taken into consideration at least what position the connected lanes have in relation to one another. The relative position may be expressed for example by the distance between the two lanes transverse to the orientation. It may also be the case that the two lanes, in particular the end points thereof, are offset parallel to the orientation when the boundary of the cultivation area does not run perpendicular to the orientation. Beyond the relative position, the absolute positions could also be taken into consideration, for example because the ground condition is locally different and has an effect on the turning path, because the available space for the turning paths is locally different or the same.

According to one configuration, the optimization criterion is based at least partially on minimizing a driving distance. "At least partially" in this connection means that minimizing the driving distance does not have to be the sole aim, but rather that other values should also be minimized or maximized, so as to create for example a compromise that may differ from just minimizing the driving distance. Provision may in particular be made to minimize the total driving distance traveled on the driving route. As an alternative, provision may also be made to minimize the total driving distance required for turning paths. These may be considered to be, as it were, an "unproductive" driving distance. It goes without saying that the two stated criteria on the bottom optimization level, that is to say when finding the optimum route, are synonymous, since the driving route in the lanes is always identical here.

As an alternative or in addition, the optimization criterion may be based at least partially on minimizing a driving time. In this case, the driving time for the entire driving route may be taken as a basis, on the one hand. The total driving time required for all lane changes or turning paths may however also be considered, which again constitutes an "unproductive" driving time. In contrast to the driving distance, the two criteria on the bottom level are not necessarily synonymous. By way of example, it could thus be the case that the cultivation area contains a slope, which leads to lanes in one direction being able to be driven through more quickly than in the other direction. The number and individual length of the lanes that are driven through "downhill" or "uphill" overall may differ depending on the order, and thus the driving time that is required overall for the lanes may also differ.

Again as an alternative or in addition, the optimization criterion may be based at least partially on minimizing an energy consumption. The provisional energy consumption for the entire driving route is normally considered here. This depends on the total driving distance, but possibly also on other parameters. The energy consumption may thus also depend on the orientation when the agricultural machine for example has to deal with a more or less severe incline within the lanes. The order may also influence the energy consumption, since the number and individual length of the lanes that are driven through "downhill" or "uphill" overall may differ, as already mentioned.

In some cases, the optimization criterion may consist in minimizing or maximizing an individual variable or an individual optimization value, for example minimizing the total driving distance. Depending on the condition of the cultivation area, the type of cultivation process to be performed, the performance data of the agricultural machine and other factors, the minimization or maximization of one optimization value may, to a certain degree, compete with a minimization or maximization, which is likewise desirable, of another optimization value. In this case, the isolated optimization of a single optimization value often does not constitute a satisfactory solution. One configuration therefore makes provision for the optimization criterion to be based on the optimization of a weighted combination of optimization values. Instead of a weighted combination, reference may normally also be made to a linear combination, even though it would in principle be conceivable for an optimization value to be incorporated in a non-linear manner, that is to say for example in a squared manner. One optimization value could in this case for example be the driving distance, while another optimization value is the driving time. The optimization criterion could then lie in the minimization of a sum, wherein one summand is proportional to the driving time and another summand is proportional to the driving distance. Selecting suitable weighting factors or normalization factors makes it possible to adapt the relative weight of the respective optimization value. The sum may also be considered to be a "total optimization value" $W_{total}$, which is defined as follows:

$$W_{total} = \Sigma_k a_k W_k$$

wherein $W_k$ denotes the k-th optimization value, for example the driving distance, driving time, etc. and $a_k$ is the respective weighting factor.

As an alternative, the optimization criterion may be based on a Pareto optimization of multiple optimization values. In other words—within an investigated parameter range—a parameter set is sought that optimizes the optimization values to the extent that no other parameter set improves one of the optimization values in relation thereto without worsening another one. For example, a parameter set consisting of orientation, positioning and order could represent a Pareto optimum with regard to driving time and driving distance when no other parameter set delivers a shorter driving time without delivering a longer driving distance, and no other parameter set delivers a shorter driving distance without delivering a longer driving time.

On the one hand, it is conceivable for the agricultural machine to have a computer system, an evaluation unit or a computing unit, that is capable of ascertaining the optimum driving route on the basis of sufficient information about the cultivation area. In many cases, however, it is more efficient if the optimum driving route is ascertained externally for at least one agricultural machine and the control data are generated externally and transmitted to the agricultural machine. This may in particular apply to all agricultural machines. The optimum driving route is then ascertained and the control data are then generated by a central computer system or a central evaluation unit, which may even be accommodated fixedly in a building that does not even have to be in the vicinity of the cultivation area. The generated control data could be transmitted to the respective agricultural machine through wireless communication, the agricultural machine then using the generated control data to cover the optimum driving route. Owing to the central external processing, the agricultural machine requires only a few resources with regard to computing capacity and memory space. It is thereby furthermore possible to add or to omit individual agricultural machines and their associated cultivation steps as required more easily than when resources required for planning are located in one of the agricultural machines.

Control data may be generated for at least one self-driving agricultural machine, which performs at least one cultivation step autonomously based on the control data. In other words, if the control data are available to this agricultural machine, it is able to cover the optimum driving route and perform the associated cultivation step without human intervention. The agricultural machine may use different internal and/or external sensors for navigation. In some cases, it may orient itself at least partially with a structure of the cultivation area, for example with a structure of a stand contained within the cultivation area, in particular stand limits, rows, etc. Even without an existing stand, other structures may however be used, for example furrows. Different sensors may be used, in particular depending on the condition of the cultivation area, for example mechanical or optical sensors, active or passive sensors. The agricultural machine may in particular use a GNSS receiver to identify its current actual position and to compare it with a setpoint position corresponding to the optimum driving route.

As an alternative or—in particular in the case of multiple cultivation steps—in addition, control data may be generated for at least one agricultural machine steered by a driver, such that control instructions are able to be generated for the driver on the basis of the control data. In this case, the control data may be available within the agricultural machine and be converted into control instructions. As an alternative, it would also be conceivable to create control instructions externally on the basis of the control data and to transmit them to the agricultural machine. It is also conceivable for one and the same agricultural machine to be steered sometimes autonomously and sometimes by a driver. The control instructions may be output visually and/or acoustically. The control instructions could explicitly indicate to the driver how he should steer the agricultural machine, or a setpoint driving line could for example be displayed on a screen, based on which the driver is able to orient himself.

The object is furthermore achieved by a computer system for performing driving route optimization in field cultivation having a plurality of cultivation steps, wherein in each cultivation step a predefined cultivation area is driven through by an agricultural machine in accordance with a driving route containing a plurality of parallel lanes, wherein the driving route is able to be characterized by an orientation of the lanes, a positioning that defines positions of all of the lanes, and an order in which the lanes are driven through, wherein the orientation is the same for all cultivation steps, wherein the computer system is configured, for a plurality of cultivation steps, to perform in each case an automatic optimization of the order for each of a plurality of combinations of in each case an orientation and a positioning by ascertaining, from a plurality of orders, an order that is optimum for this combination in accordance with a defined optimization criterion for performing driving route optimization, wherein in each case combinations with corresponding orientation are taken as a basis for all cultivation steps; to perform an automatic optimization of the driving routes for each cultivation step by ascertaining, from the plurality of combinations, incorporating the optimum order ascertained for the respective combination, a combination that is optimum in accordance with the optimization criterion and that corresponds to an optimum driving route for this cultivation step, wherein the orientation of the optimum driving routes is the same for all cultivation steps; and to automatically generate control data for controlling at least one agricultural machine during each of the cultivation steps, wherein the control data represent the optimum driving route.

According to the invention, the optimization criterion takes into consideration each of the cultivation steps, such that the driving route for the respective cultivation step is optimized on the basis of all cultivation steps.

Said terms have already been explained above with reference to the method according to the invention and are therefore not explained again here. The computer system has at least one computer or processor or one data processing unit. It may also have other components, for example wireless and/or wired interfaces for one-way or two-way communication with other devices. Advantageous configurations of the computer system according to the invention correspond to those of the method according to the invention. The computer system may in particular be a farm management information system that is arranged outside the at least one agricultural machine, for example fixedly within a building. The computer system could also be arranged in a mobile unit, for example laptop, tablet, smartphone, etc., which displays control instructions for the driver or transmits control data, in particular wirelessly, to the agricultural machine. More generally speaking, the computer system may be formed externally in relation to the at least one agricultural machine and be configured to generate the control data for transmission to the at least one agricultural machine. It may have an interface for transmitting data to the at least one agricultural machine and be configured to transmit the control data, in particular in a wired or wireless manner, to the at least one agricultural machine.

As an alternative, the computer system may be integrated into an agricultural machine; in other words, it may be part of the agricultural machine and be arranged therein. The computer system may in any case be implemented at least partially in the form of software. Regardless of whether or not the computer system is part of the agricultural machine, it may be configured to control the agricultural machine in accordance with the control data.

According to the second alternative, the invention also provides an agricultural machine having a computer system for performing driving route optimization in field cultivation having a plurality of cultivation steps, wherein in each cultivation step a predefined cultivation area is driven through by an agricultural machine in accordance with a driving route containing a plurality of parallel lanes, wherein the driving route is able to be characterized by an orientation of the lanes, a positioning that defines positions of all of the lanes, and an order in which the lanes are driven through, wherein the orientation is the same for all cultivation steps, wherein the computer system is configured, for a plurality of cultivation steps, to perform in each case an automatic optimization of the order for each of a plurality of combinations of in each case an orientation and a positioning by ascertaining, from a plurality of orders, an order that is optimum for this combination in accordance with a defined optimization criterion for performing driving route optimization, wherein in each case combinations with corresponding orientation are taken as a basis for all cultivation steps; to perform an automatic optimization of the driving routes for each cultivation step by ascertaining, from the plurality of combinations, incorporating the optimum order ascertained for the respective combination, a combination that is optimum in accordance with the optimization criterion and that corresponds to an optimum driving route for this cultivation step, wherein the orientation of the optimum driving routes is the same for all cultivation steps; and to automatically generate control data for controlling at least one agricultural machine during each of the cultivation steps, wherein the control data represent the optimum driving route.

According to the invention, the optimization criterion takes into consideration each of the cultivation steps, such that the driving route for the respective cultivation step is optimized on the basis of all cultivation steps.

Preferred embodiments of the agricultural machine according to the invention again correspond to those of the method according to the invention.

The invention furthermore provides a computer program product containing program code means that enable a computer system to carry out the method according to the invention. The computer program product thus contains software that implements the method according to the invention on the hardware of the computer system. This may be in the form of a data carrier on which the software and/or the program code means are stored, in particular in a volatile and/or non-volatile manner. The data carrier may in this case also be integrated or able to be integrated permanently into the computer system.

BRIEF DESCRIPTION OF THE DRAWINGS

Reference is now made more particularly to the drawings, which illustrate the best presently known mode of carrying

DETAILED DESCRIPTION OF THE DRAWINGS

Figure 1:
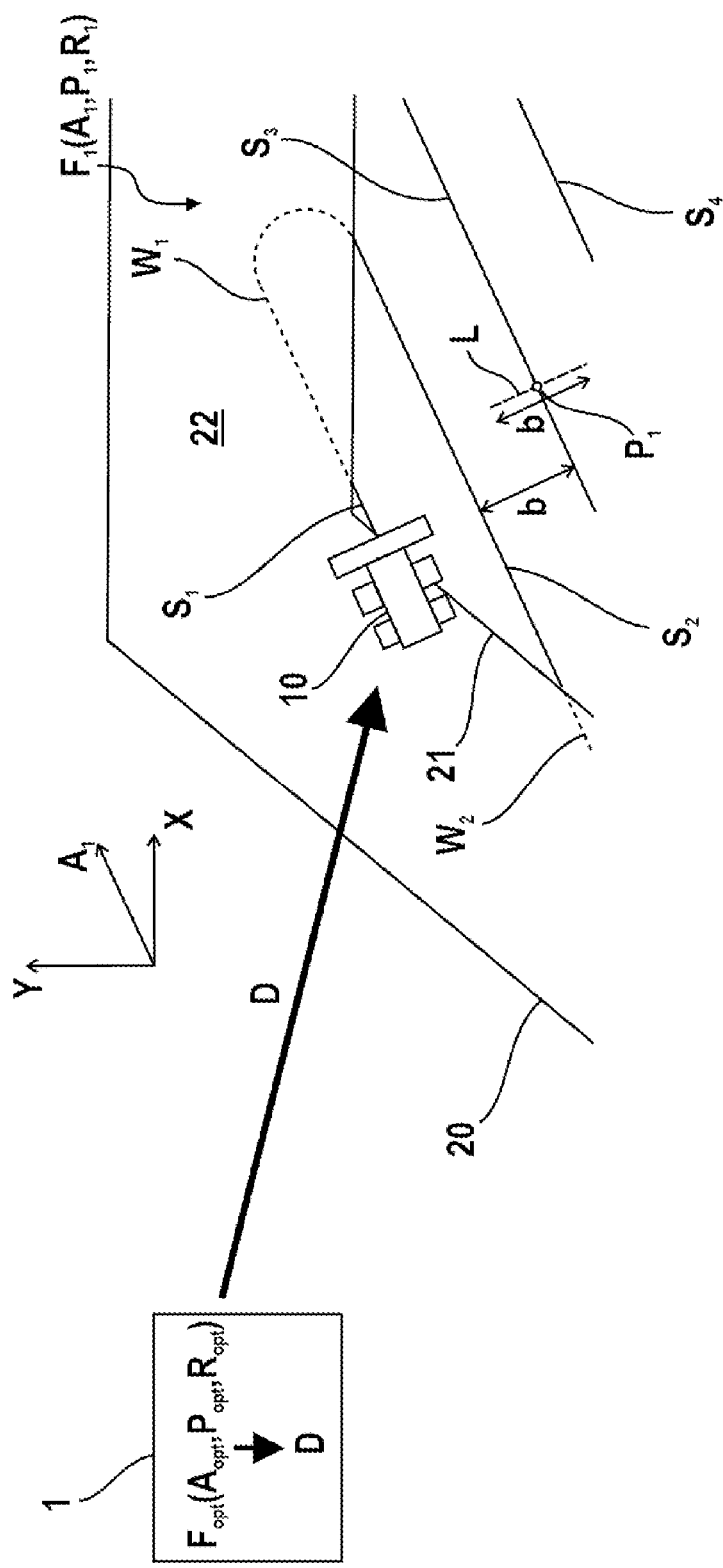
FIG. 1 shows a plan view of part of a plot with an agricultural machine and a computer system according to the invention for performing driving route optimization.
Figure 2:
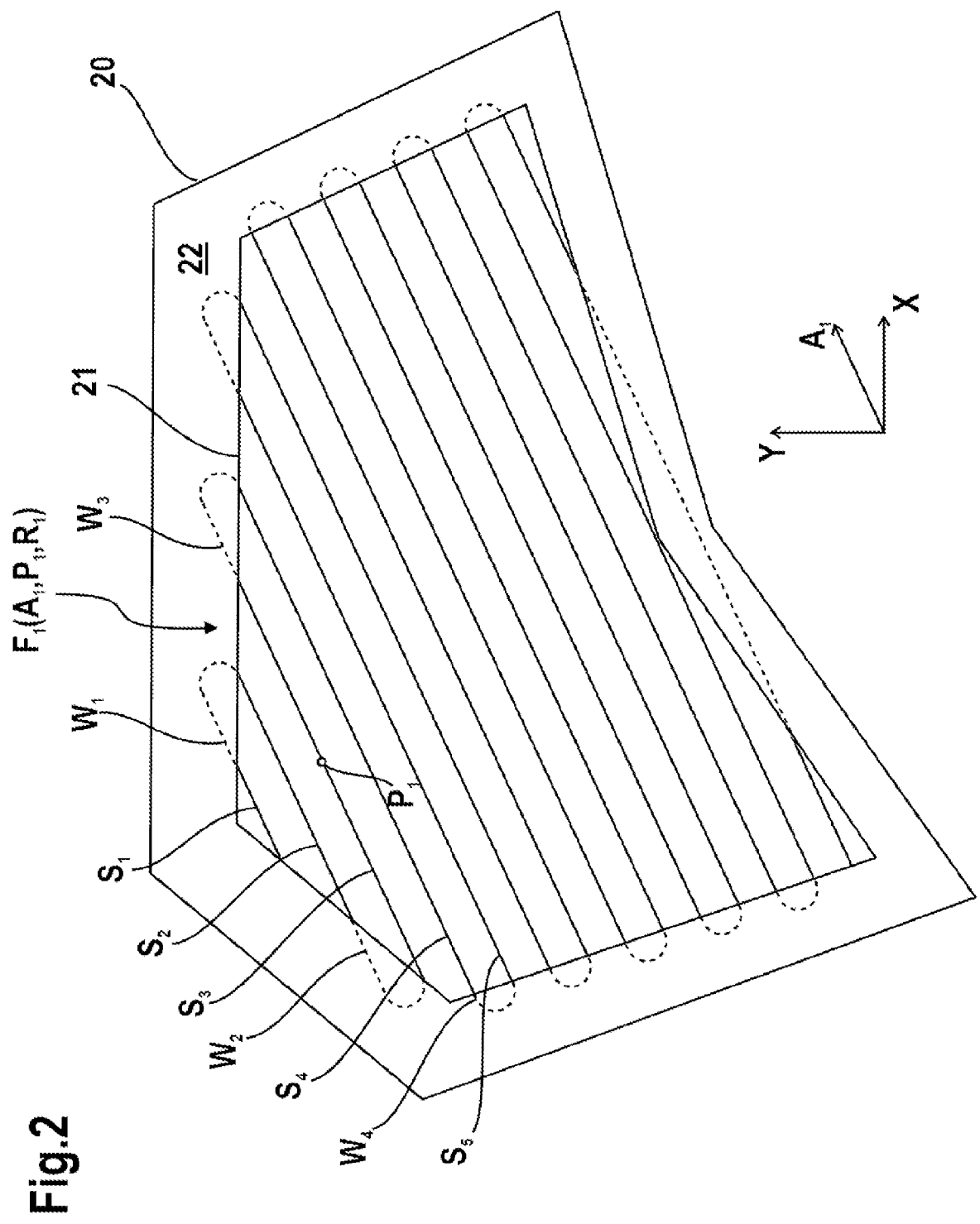
FIG. 2 shows a plan view of the field from FIG. 1 with a first driving route.

FIG. 1 shows a plan view of part of a plot 20 and an agricultural machine 10, for example a field chopper. A computer system 1 according to the invention for performing driving route optimization is illustrated in highly schematic form, said computer system in this case being arranged outside the agricultural machine 10, for example in a building that may be far away from the plot 20. The computer system 1 may be formed by a farm management information system or constitute part thereof. It has an interface, not illustrated in detail here, for wireless data transmission to the agricultural machine 10. Provision is made for the agricultural machine 10 to perform a cultivation step in a cultivation area 21 of the plot 20, for example harvesting and chopping corn, wherein the agricultural machine 10 covers a plurality of parallel lanes $S_1$-$S_5$. The cultivation area 21 is surrounded by a surrounding headland 22 that serves to allow the agricultural machine 10 to perform turning maneuvers between the individual lanes $S_1$-$S_5$. Provision is made overall for a plurality of successive cultivation steps, which are generally performed by different agricultural machines 10.

Figure 5:
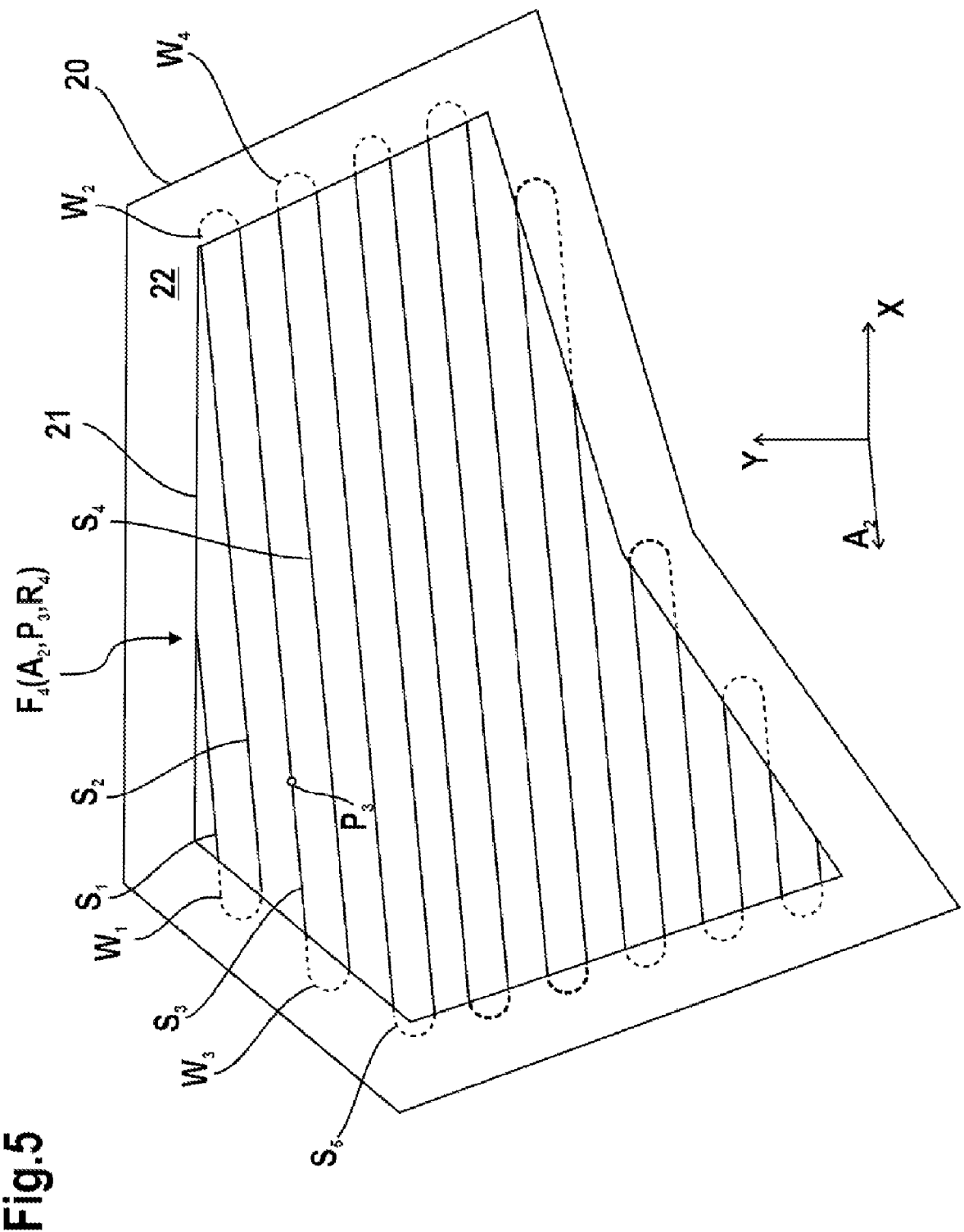
FIG. 5 shows a plan view of the field from FIG. 1 with a fourth driving route.
Figure 6:
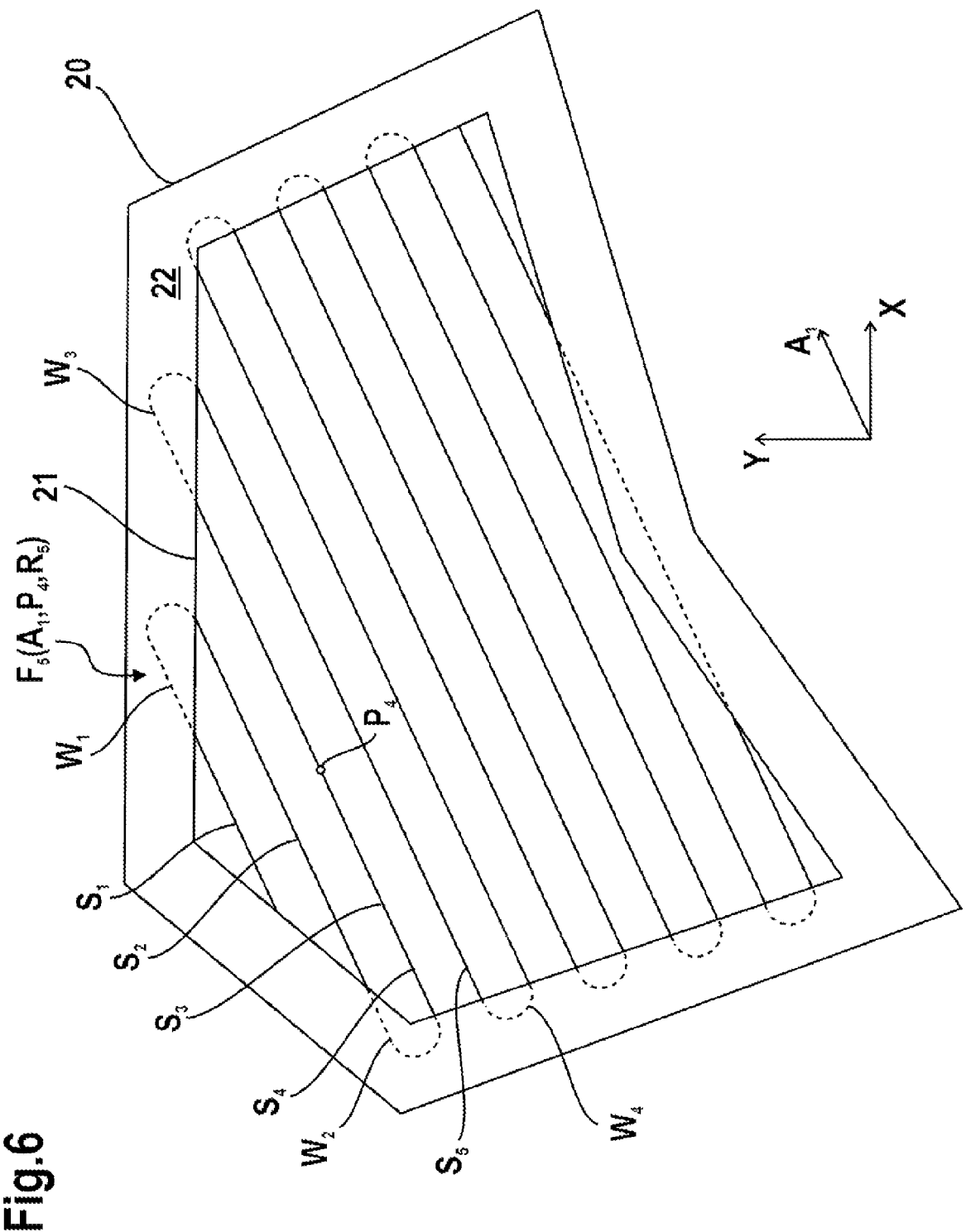
FIG. 6 shows a plan view of the field from FIG. 1 with a fifth driving route.
Figure 7:
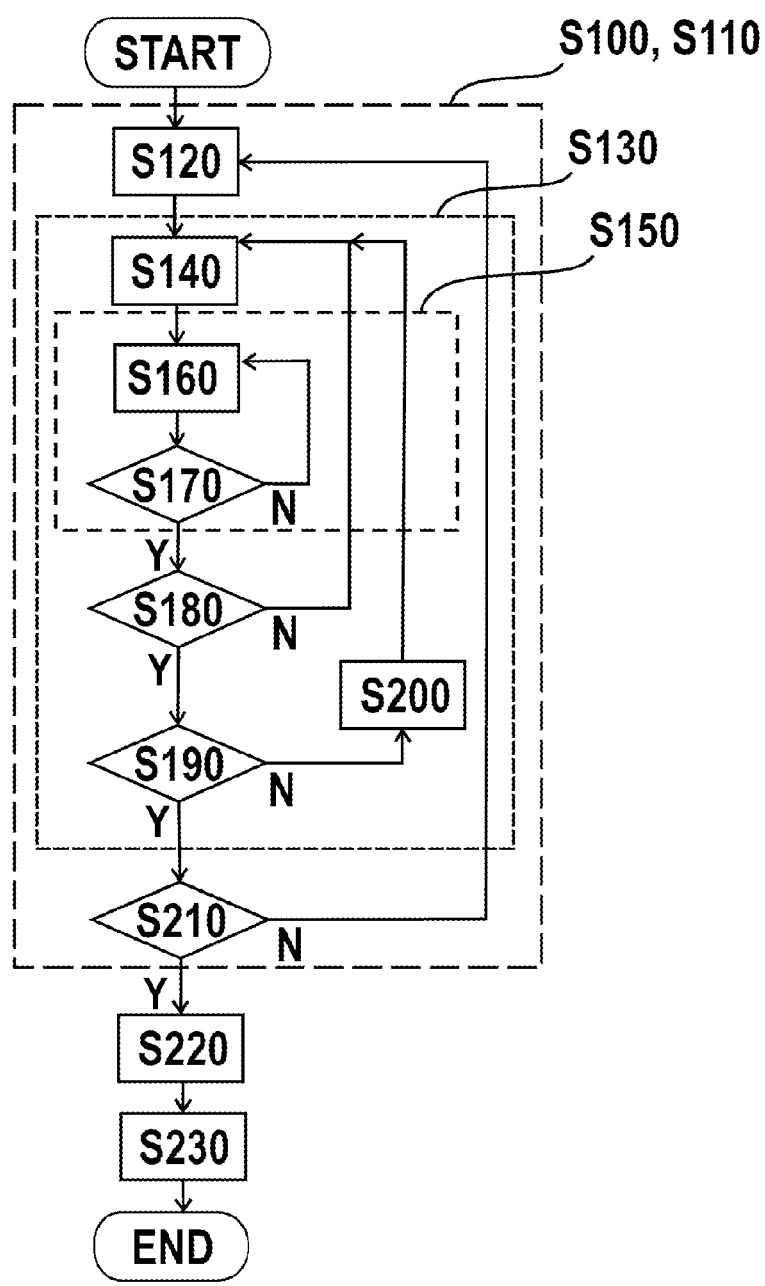
FIG. 7 shows a flowchart of a method according to the invention for performing driving route optimization.

Prior to the field cultivation, the computer system 1 performs a method according to the invention for performing driving route optimization, this being explained with reference to the flowchart in FIG. 7 and with reference to the plan view of the plot 20 in FIGS. 2 to 6. The system 1 possesses various data in relation to the plot 20, in particular the geometric dimensions of the cultivation area 21 and possibly those of the headland 22. Further data, such as for example the local ground condition or any slope that may be present, may optionally be incorporated. The computer system 1 also possesses data regarding the agricultural machine 10, in particular an effective working width thereof and its minimum turning radius. The performance data of the agricultural machine 10 as a function of ground condition, slope or other factors may also be known, for example a speed dependent thereon, a fuel consumption or the like.

The driving route optimization serves to find an optimum driving route $F_{opt}$ for the agricultural machine 10, which may be expressed by an optimum orientation $A_{opt}$, an optimum positioning $P_{opt}$ and an optimum order $R_{opt}$. For this purpose, an optimization criterion is defined and an optimization is performed on the basis of the optimization criterion. This may be for example minimizing a total driving distance, minimizing a driving distance for the turning maneuvers, minimizing a total driving time, minimizing a fuel consumption or the like. It is also possible to define multiple sub-criteria between which there may be certain competition. On the one hand, it is possible to strive to minimize a weighted combination of various optimization values, for example a driving distance, a driving time, etc., and on the other hand, it is also possible to perform a Pareto optimization with regard to various optimization values.

Each driving route may be characterized based on an orientation $A_1$, $A_2$, an positioning $P_1$-$P_4$ and an order $R_1$-$R_5$. The orientation $A_1$, $A_2$ refers to how the lanes $S_1$-$S_5$ are oriented with respect to a reference system, the figures showing a two-dimensional coordinate system with an X-axis and a Y-axis, wherein the X-axis may point for example to the east, while the Y-axis points to the north. In the case of the straight, parallel lanes $S_1$-$S_5$ that are shown here, the orientation $A_1$-$A_2$ may be represented in such a reference system by a single angle indication. The positioning $P_1$-$P_4$ denotes the positions of the lanes $S_1$-$S_5$ wherein it is sufficient, with knowledge of a track width b, which corresponds to the abovementioned effective working width of the agricultural machine 10, to specify a two-dimensional coordinate point on one of the lanes $S_1$-$S_5$, as illustrated in FIGS. 1 to 6. In order to cover the entire cultivation area 21, a different number of lanes $S_1$-$S_5$ may be necessary depending on the orientation $A_1$, $A_2$; in the example according to FIG. 2, there are fourteen lanes $S_1$-$S_5$ that are arranged in accordance with a first orientation $A_1$ and a first positioning $P_1$. These lanes $S_1$-$S_5$ are covered in a first order $R_1$, which may be selected differently.

The optimization is performed in nested form, with an optimization being performed on two or three different levels depending on the approach. It may be said that an optimum combination of an orientation $A_1$-$A_2$ and a positioning $P_1$-$P_4$ is ascertained on a top level, at S100 in the flowchart of FIG. 7, while an optimum order $R_{opt}$ is ascertained on a bottom level at S150. More precisely, it may be said that, in the case of more than two levels, an optimum orientation $A_{opt}$ is ascertained on the top level at S110, an optimum positioning $P_{opt}$ is ascertained on a middle level at S130, and an optimum order $R_{opt}$ is ascertained on the bottom level at S150, wherein the optimizations are nested within one another on the three levels, as may be readily seen graphically in FIG. 7.

Figure 3:
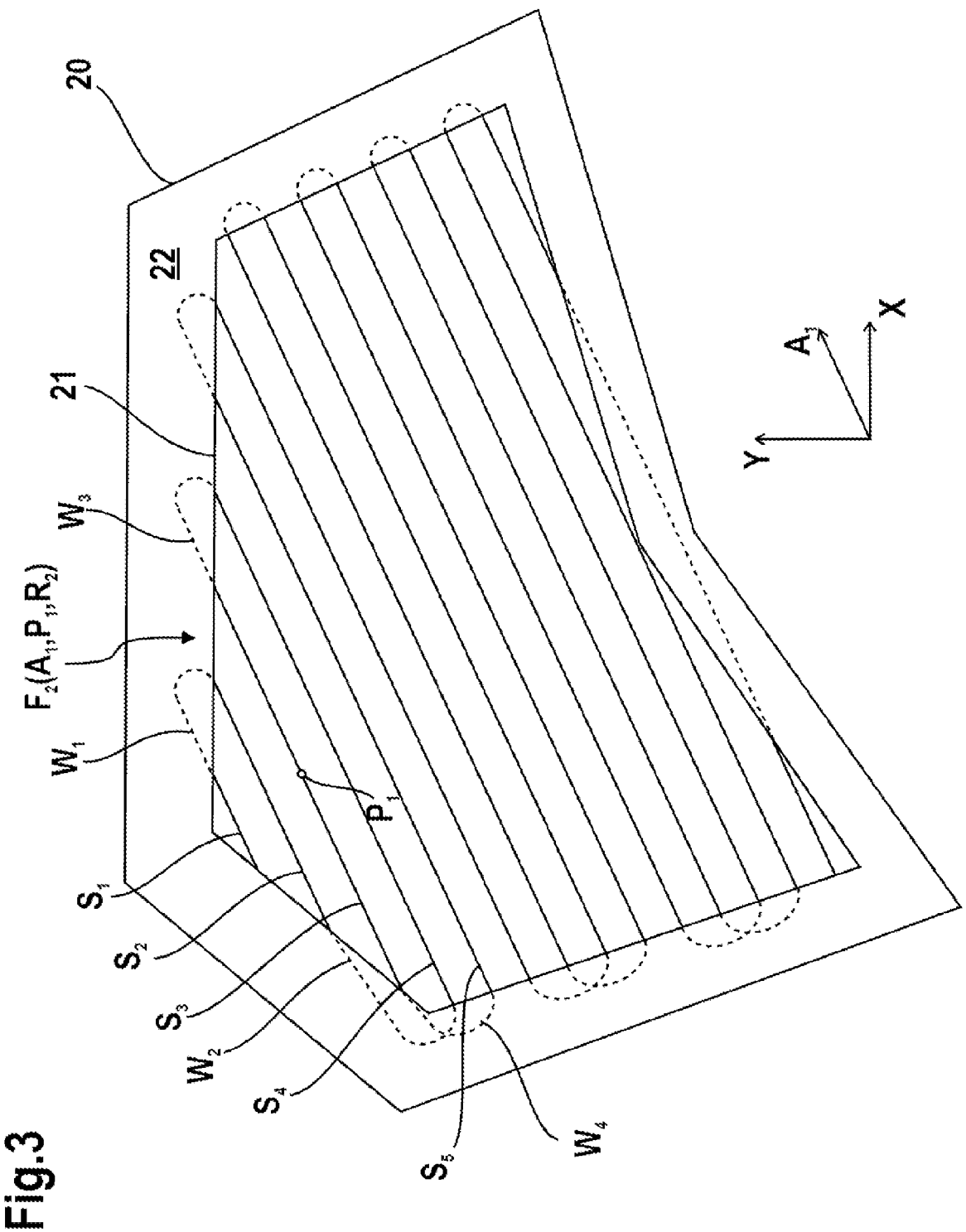
FIG. 3 shows a plan view of the field from FIG. 1 with a second driving route.
Figure 4:
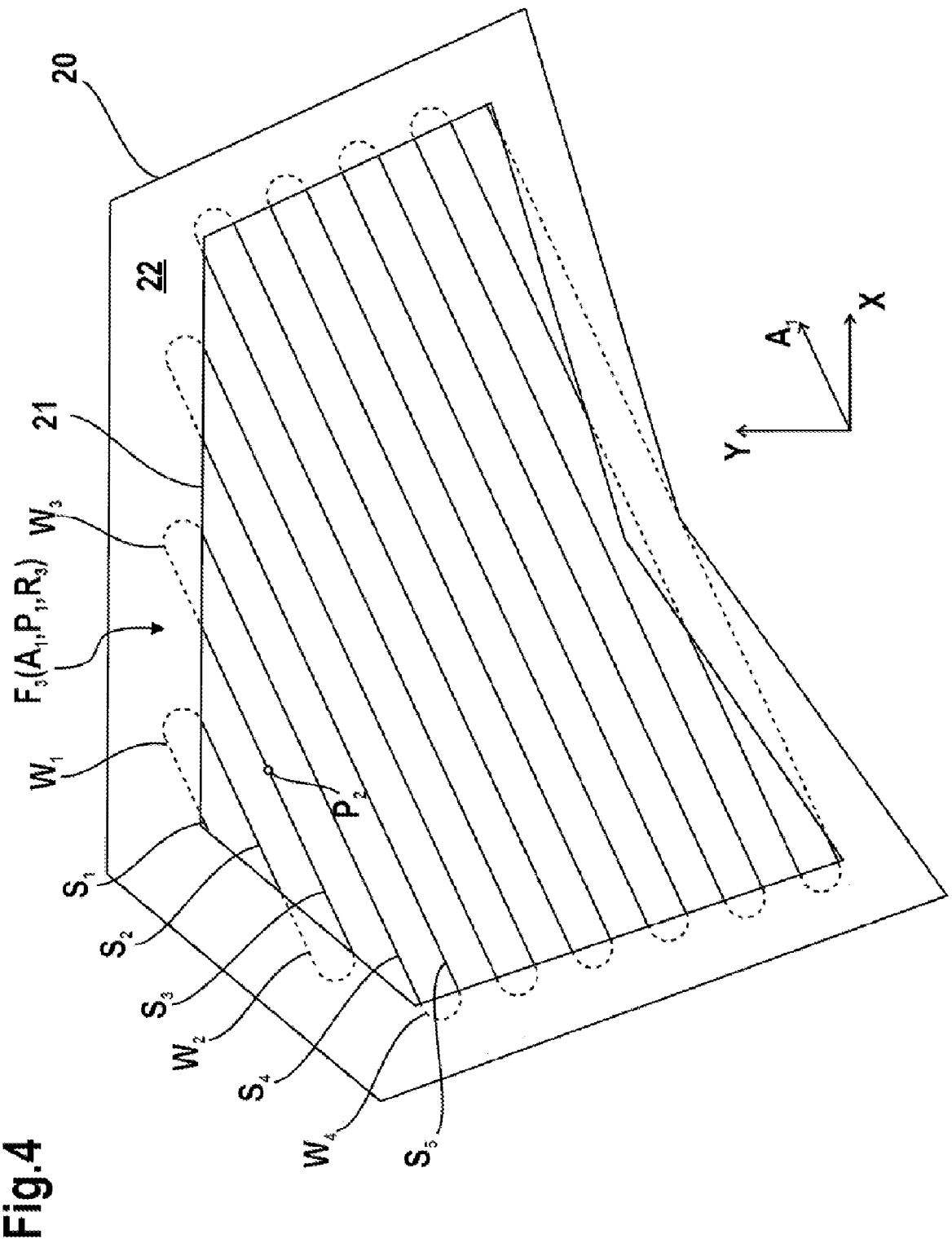
FIG. 4 shows a plan view of the field from FIG. 1 with a third driving route.

An orientation $A_1$, $A_2$ is selected on the top level at S120. A first positioning $P_1$ is then selected for this in step S140, which forms a first step for ascertaining the optimum positioning $P_{opt}$. In step S160, an order $R_1$-$R_5$ is in turn selected for said orientation $A_1$-$A_2$ and the positioning $P_1$-$P_4$. In step S170, it is checked whether an optimum order $R_{opt}$ has already been found, which is generally not the case for the first order $R_1$, and so the method returns to step S160, where a second order $R_2$, illustrated in FIG. 3, is selected. It is checked, for each order $R_1$-$R_5$, whether this, in combination with the respectively selected orientation $A_1$, $A_2$ and positioning $P_1$-$P_4$, is optimum with regard to the optimization criterion, for example minimizes an optimization value such as total driving time, total driving distance or the like. To calculate the optimization value, which may also be referred to as cost value, contributions of the driving routes of all cultivation steps are summed. To calculate the contribution of a driving route, respective contributions of individual route sections of the driving route are summed, which includes both the route sections of lanes $S_1$-$S_5$ and the route sections of turning paths $W_1$-$W_4$. Provision is made here for the contributions of the turning paths $W_1$-$W_4$ to be taken into consideration realistically inasmuch as they depend at least on the relative positions of the lanes $S_1$-$S_5$ connected by the turning path $W_1$-$W_4$, but preferably depend explicitly on the connected lanes $S_1$-$S_5$. This is expedient inasmuch as, for example in FIG. 2, the second turning path $W_2$ from the second lane $S_2$ to the third lane $S_3$ objectively has a longer path length and requires a longer driving time than for example the fourth turning path $W_4$ from the fourth lane $S_4$ to the fifth lane $S_5$. To find the optimum order $R_{opt}$, all conceivable orders $R_1$-$R_5$ could be tested, which, although it would be a reliable approach, would be an inefficient approach with regard to time and computing effort. Instead, it is possible to use various numerical methods, in particular metaheuristic methods.

If it is decided in step S170 that the optimum order $R_{opt}$ has been found, the optimization is ended on the bottom level and it is checked, in step S180, whether the optimum positioning $P_{opt}$ with respect to the respective orientation $A_1$-$A_2$ has already been found. If this is not the case, the method returns to step S140, where a new positioning P is selected, for example the second positioning $P_2$ illustrated in FIG. 4, in which the total number of lanes $S_1$-$S_5$ is increased to fifteen. In this case, the optimization has to be performed on the bottom level for each positioning $P_1$-$P_4$; in other words, it is necessary to ascertain an optimum order $R_{opt}$ in each case. Since a displacement of the positioning $P_1$-$P_4$ in the direction of the orientation $A_1$, $A_2$ does not change the actual position of the lanes, just as a displacement transverse to the orientation $A_1$-$A_2$ by an integer multiple of a track width B does not, the search for the optimum positioning $P_{opt}$ may be restricted to a search line L, illustrated in FIG. 1, that runs transverse to the first orientation $A_1$ and the length of which corresponds to the track width b.

If it is decided in step S180 that the optimum positioning $P_{opt}$ has been found, the optimization is ended on the middle level, whereby the optimum positioning $P_{opt}$ and optimum order $R_{opt}$ have been found for a specific orientation $A_1$-$A_2$. It is checked, in step S190, whether the optimum positioning $P_{opt}$ for the last cultivation step has already been found. If not, in step S200, the next cultivation step for optimizing the positioning $P_1$-$P_4$ is selected and the method returns to S140. For different cultivation steps, there are generally different resultant optimum positions $P_{opt}$ and orders $R_{opt}$. FIG. 6 shows, for the first orientation $A_1$, one example of a fourth positioning $P_4$ for another cultivation step that takes place using a different agricultural machine (not illustrated here) that has a different track width. The result of the optimization of the positioning $P_1$-$P_4$ in the further cultivation steps may in some cases depend on the optimum positioning $P_{opt}$ for the first cultivation step, for example when a compressed soil surface is intended to be minimized, which is possible in terms of quality by virtue of a following agricultural machine driving with its wheels in the tracks of the previous agricultural machine.

If it is established, in step S190, that all cultivation steps have been included, the method continues with step S210. After finding the optimum positionings $P_{opt}$ for the respective cultivation steps, that orientation $A_1$, $A_2$ that, in combination with the optimum positioning $P_{opt}$ and optimum order $R_{opt}$ assigned thereto, represents an optimum driving route $F_{opt}$, is ascertained on the top level. In step S210, it is checked whether the optimum orientation $A_{opt}$ has already been found. If not, the method returns to step S120, where a second orientation $A_2$, illustrated in FIG. 5, is checked, for which the associated optimum positioning $P_{opt}$ and optimum order $R_{opt}$ again have to be ascertained.

If it is established, in step S210, that the optimum orientation $A_{opt}$ has been found, optimum parameters for the orientation $A_1$, $A_2$, the positioning $P_1$-$P_4$ and the order $R_1$-$R_5$ have now been defined and correspond to an optimum driving route $F_{opt}$. The computer system 1 then generates, in step S220, control data D for the agricultural machine 10, which correspond to the optimum driving route $F_{opt}$, in particular the optimum orientation $A_{opt}$, optimum positioning $P_{opt}$ and optimum order $R_{opt}$. If the agricultural machine 10 is controlled by a driver, the control data D may correspond to instructions for the driver based on which he is able to control the agricultural machine 10 along the driving route. If the agricultural machine 10 drives autonomously, the control data D may contain explicit driving commands and/or steering commands for the systems of the agricultural machine 10. In step S230, the control data D are transmitted wirelessly to the agricultural machine 10, as indicated in FIG. 1.

In order to give the computer system 1 the ability to perform the illustrated method, the required software may be made available as a computer program product, for example as a mobile or integrated data carrier that contains program code means and/or a program code that implements the method on the hardware of the computer system.

According to one alternative, not illustrated, the computer system 1 may also be integrated into the agricultural machine 10. In this case, the control data D are available directly in the agricultural machine 10.

The invention claimed is:

1. A method for controlling at least one agricultural machine engaged in cultivation with a computer system in communication with the agricultural machine that controls routes in field cultivation automatically, wherein in each cultivation step a predefined cultivation area is driven through by an agricultural machine in accordance with a driving route ($F_1$-$F_5$) containing a plurality of parallel lanes ($S_1$-$S_5$), wherein the driving route ($F_1$-$F_5$) is able to be characterized by an orientation ($A_1$-$A_2$) of the lanes ($S_1$-$S_5$), a positioning ($P_1$-$P_4$) that defines positions of all of the lanes ($S_1$-$S_5$), and an order ($R_1$-$R_5$) in which the lanes ($S_1$-$S_5$) are driven through, wherein the orientation ($A_1$-$A_2$) is the same for all cultivation steps, the method comprising the following steps:

controlling the at least one agricultural machine in cultivating a field with the computer system to provide an automatic optimization of the order ($R_1$-$R_5$) for each of a plurality of combinations of in each case, an orientation ($A_1$, $A_2$) and a positioning ($P_1$-$P_4$) by ascertaining, from a plurality of orders ($R_1$-$R_5$), an order ($R_{opt}$) that is optimum for this combination in accordance with a defined optimization criterion for performing driving route optimization for field cultivation, wherein in each case combinations with corresponding orientation are taken as a basis for all cultivation steps;

automatically controlling the at least one agricultural machine in cultivating a field with the computer system to provide an automatic optimization of the driving routes ($F_1$-$F_5$) for each cultivation step by ascertaining, from the plurality of combinations, incorporating the optimum order ($R_{opt}$) ascertained for the respective combination, a combination that is optimum in accordance with the optimization criterion and that corresponds to an optimum driving route ($F_{opt}$) for this cultivation step, wherein the orientation ($A_1$-$A_2$) of the optimum driving routes ($F_{opt}$) is the same for all cultivation steps; and automatically controlling the at least one agricultural machine in cultivating a field with the computer system to provide in with generated control data (D) for controlling at least one agricultural machine during each of the cultivation steps, wherein the control data represent the optimum driving route ($F_{opt}$), wherein the optimization criterion takes into consideration each of the cultivation steps, such that the driving route ($F_1$-$F_5$) for the respective cultivation step is optimized on the basis of all cultivation steps.

2. The method as claimed in claim 1, wherein the plurality of combinations contains different combinations of a single orientation ($A_1$-$A_2$) with different positionings ($P_1$-$P_4$) and, in order to optimize the driving route ($F_1$-$F_5$), an optimum positioning ($P_{opt}$) from a plurality of positionings ($P_1$-$P_4$) is ascertained (S130) for each of a plurality of orientations ($A_1$-$A_2$), and the optimum combination from a plurality of combinations of in each case an orientation ($A_1$-$A_2$) and the optimum positioning ($P_{opt}$) ascertained with respect thereto is ascertained with the computer system that controls the at least one agricultural machine in cultivating a field.

3. The method as claimed in claim 1, wherein the optimization criterion is based at least partially on an optimization of an optimization value that is ascertained by summing contributions of the driving routes ($F_1$-$F_5$) of the cultivation steps with the computer system that controls the at least one agricultural machine in cultivating a field.

4. The method as claimed in claim 1, wherein the contribution of a driving route ($F_1$-$F_5$) to the optimization value is ascertained by summing contributions of individual route sections of the driving route ($F_1$-$F_5$) with the computer system that controls the at least one agricultural machine in cultivating a field.

5. The method as claimed in claim 1, wherein the optimization criterion in each optimization takes into consideration both route sections of the lanes ($S_1$-$S_5$) and route sections of turning paths ($W_1$-$W_4$) connecting the lanes ($S_1$-$S_5$), wherein the route sections of the turning paths ($W_1$-$W_4$) are taken into consideration on the basis of the respective order ($R_1$-$R_5$) with the computer system that controls the at least one agricultural machine in cultivating a field.

6. The method as claimed in claim 1, wherein the optimization criterion in each optimization takes into consideration a route section of a turning path ($W_1$-$W_4$) connecting two lanes ($S_1$-$S_5$) at least on the basis of a relative position of these lanes ($S_1$-$S_5$) with the computer system that controls the at least one agricultural machine in cultivating a field.

7. The method as claimed in claim 1, wherein the optimization criterion is based at least partially on minimizing a driving distance, minimizing a driving time, and/or minimizing an energy consumption with the computer system that controls the at least one agricultural machine in cultivating a field.

8. The method as claimed in claim 1, wherein the optimization criterion is based on optimizing a weighted combination of multiple optimization values with the computer system that controls the at least one agricultural machine in cultivating a field.

9. The method as claimed in claim 1, wherein the optimization criterion is based on a Pareto optimization of multiple optimization values with the computer system that controls the at least one agricultural machine in cultivating a field.

10. The method as claimed in claim 1, wherein the optimum driving route ($F_{opt}$) is ascertained externally for at least one agricultural machine (10) and the control data (D) are generated externally and transmitted to the agricultural machine with the computer system that controls the at least one agricultural machine in cultivating a field.

11. The method as claimed in claim 1, wherein control data (D) are generated for at least one self-driving agricultural machine, which performs at least one cultivation step autonomously based on the control data (D) with the computer system that controls the at least one self-driving agricultural machine in cultivating a field.

12. The method as claimed in claim 1, wherein control data (D) are generated for at least one agricultural machine steered by a driver, such that control instructions are able to be generated for the driver on the basis of the control data (D) with the computer system that controls the at least one agricultural machine in cultivating a field.

13. A computer program product containing program code means that enable a computer system to carry out the method as claimed in claim 1 with the computer system that controls the at least one agricultural machine in cultivating a field.

14. A computer system for performing driving route optimization in field cultivation for at least one agricultural machine having a plurality of cultivation steps, wherein in each cultivation step a predefined cultivation area is driven through by an agricultural machine in accordance with a driving route ($F_1$-$F_5$) containing a plurality of parallel lanes ($S_1$-$S_5$), wherein the driving route ($F_1$-$F_5$) is able to be characterized by an orientation ($A_1$-$A_2$) of the lanes ($S_1$-$S_5$), a positioning ($P_1$-$P_4$) that defines positions of all of the lanes ($S_1$-$S_5$), and an order ($R_1$-$R_5$) in which the lanes ($S_1$-$S_5$) are driven through, wherein the orientation ($A_1$-$A_2$) is the same for all cultivation steps, wherein the computer system is configured to perform the following steps:

performing automatic optimization, for each of a plurality of cultivation steps, automatic optimization of the order ($R_1$-$R_5$) for each of a plurality of combinations of in each case an orientation ($A_1$-$A_2$) and a positioning ($P_1$-$P_4$) by ascertaining, from a plurality of orders ($R_1$-$R_5$), an order ($R_{opt}$) that is optimum for this combination in accordance with a defined optimization criterion for performing driving route optimization, wherein in each case combinations with corresponding orientation are taken as a basis for all cultivation steps that controls the at least one agricultural machine in cultivating a field;

performing an automatic optimization of the driving routes ($F_1$-$F_5$) for each cultivation step by ascertaining, from the plurality of combinations, incorporating the optimum order ($R_{opt}$) ascertained for the respective combination, a combination that is optimum in accordance with the optimization criterion and that corresponds to an optimum driving route ($F_{opt}$) for this cultivation step, wherein the orientation ($A_1$-$A_2$) of the optimum driving routes ($F_{opt}$) is the same for all cultivation steps that controls the at least one agricultural machine in cultivating the field; and automatically generating control data (D) for controlling at least one agricultural machine during each of the cultivation steps, wherein the control data represent the optimum driving route ($F_{opt}$) for cultivating the field with the at least one agricultural machine, wherein the optimization criterion takes into consideration each of the cultivation steps, such that the driving route ($F_1$-$F_5$) for the respective cultivation step is optimized on the basis of all cultivation steps.

15. The computer system as claimed in claim 14, wherein it is formed externally in relation to the at least one agricultural machine and is configured to generate the control data (D) for transmission to the at least one agricultural machine with the computer system that controls the at least one agricultural machine in cultivating a field.

16. An agricultural machine having a computer system for performing driving route optimization in field cultivation having a plurality of cultivation steps, wherein in each cultivation step a predefined cultivation area (21) is driven through by an agricultural machine (10) in accordance with a driving route ($F_1$-$F_5$) containing a plurality of parallel lanes ($S_1$-$S_5$), wherein the driving route ($F_1$-$F_5$) is able to be characterized by an orientation ($A_1$, $A_2$) of the lanes ($S_1$-$S_5$), a positioning ($P_1$-$P_4$) that defines positions of all of the lanes ($S_1$-$S_5$), and an order ($R_1$-$R_5$) in which the lanes ($S_1$-$S_5$) are driven through, wherein the orientation ($A_1$-$A_2$) is the same for all cultivation steps, wherein the computer system is configured to perform the following steps:

performing, for each of a plurality of cultivation steps, an automatic optimization of the order ($R_1$-$R_5$) for each of a plurality of combinations of in each case an orientation ($A_1$, $A_2$) and a positioning ($P_1$-$P_4$) by ascertaining, from a plurality of orders ($R_1$-$R_5$), an order ($R_{opt}$) that is optimum for this combination in accordance with a defined optimization criterion for performing driving route optimization, wherein in each case combinations with corresponding orientation are taken as a basis for all cultivation steps that controls the at least one agricultural machine in cultivating a field;

performing an automatic optimization of the driving routes ($F_1$-$F_5$) for each cultivation step by ascertaining, from the plurality of combinations, incorporating the optimum order ($R_{opt}$) ascertained for the respective combination, a combination that is optimum in accordance with the optimization criterion and that corresponds to an optimum driving route ($F_{opt}$) for this cultivation step, wherein the orientation ($A_1$-$A_2$) of the optimum driving routes ($F_{opt}$) is the same for all cultivation steps that controls the at least one agricultural machine in cultivating a field; and automatically generating control data (D) with the computer system for controlling at least one agricultural machine during each of the cultivation steps, wherein the control data represent the optimum driving route ($F_{opt}$), wherein the optimization criterion takes into consideration each of the cultivation steps, such that the driving route ($F_1$-$F_5$) for the respective cultivation step is optimized on the basis of all cultivation steps of least one agricultural machine in cultivating a field.

\* \* \* \* \*